United States Patent Office 3,845,024
Patented Oct. 29, 1974

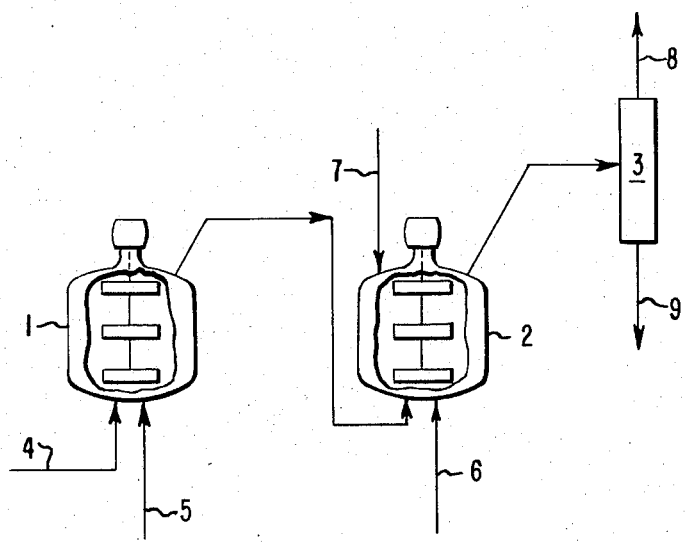

3,845,024
CONTINUOUS PROCESS FOR PRODUCTION
OF FLUOROELASTOMERS
S. David Weaver, Wilmington, Del., assignor to E. I. du
Pont de Nemours and Company, Wilmington, Del.
Filed Nov. 22, 1972, Ser. No. 308,855
Int. Cl. C08f 1/82
U.S. Cl. 260—80.77         9 Claims

ABSTRACT OF THE DISCLOSURE

A continuous cascade process for copolymerization of vinylidene fluoride with other fluorinated monomers to a product having a broad molecular weight distribution, a high molecular weight product being formed in the first of two reactors and immediately introduced into the second reactor, to which a chain transfer agent and additional monomers are added. Low molecular weight material formed in the second reactor is mixed in that reactor with the high molecular weight material from the first reactor, and the polymeric product discharged from the second reactor has a broad, bimodal, molecular weight distribution.

BACKGROUND OF THE INVENTION

This invention relates to a cascade process for the continuous copolymerization of vinylidene fluoride with other fluorinated monomers, the resulting copolymers having a bimodal molecular weight distribution. In particular, the resulting products will be mixtures of high molecular weight materials with relatively low molecular weight materials.

Many fluorinated copolymers have found important industrial applications. In particular, copolymers of vinylidene fluoride with hexafluoropropylene and terpolymers of vinylidene fluoride with hexafluoropropylene and tetrafluoroethylene are very useful elastomers. The high molecular weight grades are useful, for example, in the manufacture of cured elastomer articles having good compression set properties.

However, such products having high molecular weight often do not have adequate flow properties for rapid and efficient extrusion and molding. A polymer product which contains both very high and relatively low molecular weight materials would be expected to have better processing characteristics, while maintaining good cohesive strength. Such a product would have to be a substantially uniform blend.

It is possible to prepare a polymeric material of this type by simple mechanical blending of high and low molecular weight polymers. This method requires, of course, the preparation of two separate polymers, which then must be very carefully blended to give a product of sufficient uniformity.

It would be desirable to form a copolymer having broad molecular weight distribution in a single operation starting with the monomers. The copending application Ser. No. 197,512 of Albert Lloyd Moore, filed Nov. 10, 1971, discloses a process for the continuous copolymerization of vinylidene fluoride with other monomers to give copolymers having broad molecular weight distribution and desirable processing characteristics. The Moore process requires continuous feeding to a reactor of the monomers, water, and free radical polymerization initiators; feeding a chain-transfer agent to the reactor during a plurality of defined time cycles; causing the resulting reaction mixture to polymerize continuously; and passing the copolymer to a mixer and mixing under defined conditions until the molecular weight distribution of the copolymer is uniform.

This system requires a large volume blender or mixer that will contain all the material produced in at least one full cycle. Further, it produces a fairly large amount of transitional product during the switch from one condition to the other.

U.S. Pat. 3,547,857 teaches the continuous emulsion polymerization of styrene and/or acrylonitrile in two or more large volume reactors connected in series, wherein the feed of the monomers is split between the first and second or subsequent reactors. The reference does not show how to control such a process to produce a product having a bimodal molecular weight distribution.

SUMMARY OF THE INVENTION

According to the present invention, there is now provided a process for the continuous copolymerization of vinylidene fluoride with at least one other polymerizable, unsaturated, fluorinated monomer, wherein (1) The monomers, water and a water-soluble free radical generator at a concentration of about 0.001–2 weight percent based on the total monomers are introduced into the first of two reactors equipped with stirring or other agitating means and maintained at a temperature of about 50–130° C., and a pressure of about 250–1500 p.s.i.g. at such a flow rate that the residence time is sufficient to form a high molecular weight copolymer;

(2) The product stream is withdrawn at the same rate as the materials are introduced, and it is immediately passed into the second of the two reactors equipped with stirring or other agitating means and maintained at a temperature of about 50–130° C., and a pressure of about 250–1500 p.s.i.g.;

(3) Additional monomers, a chain transfer agent, and optionally additional free radical generator are introduced into the second reactor, the residence time being sufficient to produce a copolymer of low molecular weight; and (4) The product emulsion is continuously withdrawn from the second reactor, and the copolymer is separated.

BRIEF DESCRIPTION OF THE DRAWING

The drawing illustrates the flow diagram of a cascade reactor system of the present invention operating with a single catalyst feed.

Definition

For the purpose of the present disclosure, a copolymer having high molecular weight will have an inherent viscosity between about 1.5 and 3.0, while a low molecular weight copolymer will have an inherent viscosity of approximately 0.1–0.8, both measured at a concentration of 0.1 g. of copolymer in 100 ml. of a mixture of 86.1 weight percent of tetrahydrofuran and 13.9 weight percent of dimethylformamide at 30° C.

For the purposes of the present disclosure, a copolymer having high molecular weight will have an inherent viscosity between about 1.5 and 3.0, while a low molecular weight copolymer will have an inherent viscosity of approximately 0.1–0.8, both measured at a concentration of 0.1 g. of copolymer in 100 ml. of a mixture of 86.1 weight percent of tetrahydrofuran and 13.9 weight percent of dimethylformamide at 30° C.

For the purposes of the present disclosure, the terms "copolymerization" and "copolymer" are not limited to the concurrent polymerization of two monomers, or to a polymer containing two different monomer species but are intended to also include the concurrent polymerization of more than two monomers and a polymer of more than two different monomers, respectively.

DETAILED DESCRIPTION OF THE INVENTION

The process of the present invention permits to readily make a polymer having a bimodal molecular weight distribution with no significant amount of transition material. The operation is always at steady state after the initial startup. It is possible to use different polymerization initiators in each reactor and also to vary independently such parameters as temperature, residence time, polymerization rate, pressure, and monomer compositions. The reactor productivity is not limited by the rather low polymerization rate of the high viscosity component. The important mathematical relationships which apply in the present process can be derived as follows:

For first order decomposition of a free radical generator (I), such as persulfate, where

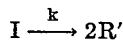

a material balance shows that the radical generation rate in a continuous, steady-state reactor is given by $$\rho = 2F \frac{k\theta}{1+k\theta} \quad (1)$$

where $\rho$ = radical generation rate, moles/hr.
$F$ = catalyst feed rate, moles/hr.
$k$ = decomposition rate constant, min.$^{-1}$
$\theta$ = reactor residence time, min.

If the same material balance is applied to a two-kettle reactor system in series operation, with catalyst feed to the first reactor only, the result is $$\rho_1 = 2F_1 \frac{k_1 \theta_1}{1+k_1 \theta_1} \quad (2)$$

and $$\rho_2 = 2F_1 \frac{k_2 \theta_2}{(1+k_1 \theta_1)(1+k_2 \theta_2)} \quad (3)$$

where the subscript 1 refers to the variables defined for Equation (1) under the conditions in the first reactor and the subscript 2 refers to those in the second reactor.

Implicit in the derivation of Equation (3) is that the line connecting the two reactors is short so that the catalyst decay in the piping is negligible, i.e., the residence time of material between reactors is very short. Where calculation of the radical generation rate is critical, a simple adjustment may be necessary to correct for catalyst decay in the connecting line.

If fresh catalyst is added to the second reactor, then a term analogous to Equation (2) must be added to Equation (3). The radical generation rate in the second reactor is then $$\rho_2 = \frac{2k_2\theta_2}{1+k_2\theta_2}\left[F_2 + \frac{F_1}{1+k_1\theta_1}\right] \quad (4)$$

Of course, Equation (2) still applies to the first reactor.

With reference to the Drawing, one possible embodiment of this invention is shown in the form of a flow diagram. In this diagram, single catalyst feed is used, that is, the catalyst is introduced to the first reactor but not to the second reactor. Specifically, a solution of free radical generator in water is introduced into the first reactor (No. 1 on the diagram) through the feed line 4; the monomers, usually as compressed gases, are introduced through the feed line 5; the overflow from the top of the first reactor is introduced at the bottom of the second reactor, 2. Additional monomer is introduced into the second reactor through the feed line 6 and the chain transfer agent through the feed line 7. The overflow from the top of the second reactor is introduced to the separator 3, from which the unchanged gaseous monomers are recovered through the vent 8, and the reaction product is withdrawn through the drain 9.

In the practical operation of the process of the present invention, there is produced in the first reactor mainly high molecular weight polymer or copolymer. In the second reactor, because of the presence of a chain transfer agent, low molecular weight and intermediate molecular weight products are formed. However, because of efficient agitation in the second reactor, the product withdrawn therefrom is a homogeneous mixture having a substantially bimodal molecular weight distribution. The reactor size is selected according to the desired production rate and residence time. The latter depends on the rate of polymerization of the selected monomers under the temperature and pressure conditions in the reactors. The rate of polymerization is also dependent on the proportion of the catalyst.

If the temperature and the proportion of the catalyst in the second reactor are about the same as in the first reactor, the polymerization rate in both reactors will be about the same. Since the rate of flow through the system is maintained constant, both reactors should be of about the same size. Usually the second reactor will be either of the same size as the first or larger since it is usually desirable to have more low molecular weight material in the product than high molecular weight material. However, it can be smaller, for example, when less low molecular weight material is desired. The above considerations are based on the assumption that polymerization is carried out at high conversions. In practice, conversions of 80% or higher are obtained.

The most suitable product for practical applications is a copolymer of vinylidene fluoride with hexafluoropropylene or a terpolymer of vinylidene fluoride with hexafluoropropylene and tetrafluoroethylene. While the proportions of the monomers can be varied, the preferred weight ratio of vinylidene fluoride to hexafluoropropylene in the two-monomer system is approximately 30:70 to 70:30. In the case of a three-monomer system, the preferred composition is 25–70% of vinylidene fluoride, 19–60% of hexafluoropropylene, and 3–35% of tetrafluoroethylene by weight. Other monomers which can be copolymerised with vinylidene fluoride by the process of the present invention include, for example, chlorotrifluoroethylene, dichlorodifluoroethylene, chlorofluoroethylene, trifluoropropene, hexafluorobutene, fluorinated vinyl esters, derivatives of perfluoroacrylic acid, fluorinated alkyl vinyl ethers (e.g., perfluoroalkyl perfluorovinyl ethers), and 1,2,3,3,3-pentafluoropropylene.

The relative proportion of the monomer is usually maintained at the same level in both reactors, but they may be changed in such a way as to provide a blend that differs in composition as well as in molecular weight.

The polymerization is initiated by a free radical generator, which can be any inorganic persulfate, peroxide, perphosphate, perborate, or percarbonate. However, the preferred initiators are ammonium persulfate, sodium persulfate, potassium persulfate, or a mixture of two or more such compounds. The initiator can be used in combination with a reducing agent such as an alkali metal or ammonium sulfite, bisulfite, metabisulfite, hydrosulfite, thiosulfate, phosphite, or hypophosphite; or in combination with a ferrous, cuprous, or silver salt, or other easily oxidized metal compound. Such initiator systems are well known to those skilled in the art of polymerization. The preferred initiator is ammonium persulfate, which is preferably used in a redox system with sodium bisulfite.

Since this polymerization is carried out in an aqueous emulsion, the reaction catalysts should be water-soluble. The catalysts such as persulfates or peroxides can be decomposed either by reducing agents in a redox system or by thermal decomposition. The pH of the reaction medium normally is quite low, for instance, from about 2 to about 7½. The solids concentration in each reactor usually is from about 10 to about 30 weight percent, a concentration of product of about 15–25 weight percent being preferred. Nevertheless, the concentration does not have to be the same in both reactors. The maximum practical concentration of solids in each reactor is about 50 weight percent since above that concentration the viscosity of the resulting latex system is too high for effective stirring. In the practical operation of this process, both reactors are filled with liquid, the back pressure being controlled.

The monomers must be under sufficiently high pressure to enter the reactors. The monomer pressure usually is maintained at about 600–900 p.s.i.g., but the exact pressure is not critical, as long as it is sufficient to propel the monomers into the reactors.

The chain-transfer agent used in the second reactor is a material capable in any given polymerization system of the present invention of transferring the radical activity from a growing polymer molecule to a molecule of the transfer agent, thus initiating growth of another polymer molecule. The most common chain transfer agents are alcohols, esters, halogenated hydrocarbons, ketones, and mercaptans having 1–12 carbon atoms. Various chain-transfer agents which can be used in the process of the present invention include among others, diethyl malonate, diethyl succinate, ethyl acetate, methylene bromide, carbon tetrachloride, ethanol, n-propanol, 2-propanol, acetone, dodecyl mercaptan, methanol, methyl acetate, butyl acetate, ethyl propionate, cyclohexanone, methylene chloride, and the like, either alone or in mixtures of two or more such compound. Also useful are various isoparaffins, such as alkanes of 4–18 carbon atoms containing at least one tertiary carbon atom for every 3–6 nontertiary carbon atoms, for example, isobutane, isopentane, isohexane, 2,6-dimethylheptane and the like. Diethyl malonate is the preferred transfer agent in the process of the present invention. The proportion of the chain-transfer agent will be approximately from 1 to 6 moles per mole of free radical generator.

The proportions of materials fed to the reactors are preferably such that the final blended polymer has an inherent viscosity of about 0.4–1.5, as determined at a polymer concentration of 0.1% by weight in a solvent composed of 86.1% by weight of tetrahydrofuran and 13.9% by weight of dimethylformamide at 30° C. The emulsion polymerization is preferably carried out at a temperature of about 100–130° C.

It is often useful to add to the first reactor an emulsion stabilizer such as a surfactant and/or an alkaline compound to improve the stability of latex. The alkaline compound can be, for example, sodium hydroxide, potassium hydroxide, lithium hydroxide, ammonium hydroxide, sodium phosphate, disodium phosphate, monosodium phosphate, sodium fluoride, potassium fluoride, and such. Not all surfactants are suitable in the process of this invention since ordinary aliphatic acid soaps, for example, inhibit polymerization. Fluorocarbon acid soaps are preferred. They include, for example, ammonium ω-hydroperfluoroheptanoate and ammonium perfluorooctanoate. Other dispersing agents include, for example, salts of chlorendic acid. The amount of the surfactant is about 0.01–0.2% of the weight of the water used in the reaction. If alkaline compounds are used, their concentration should be preferably such as to maintain a pH of about 3.5–6 in the reactor. Alternatively, the ratio of the alkaline compounds to the initiator should correspond to about 0.1–0.25 g. of sodium hydroxide per gram of ammonium persulfate.

The process of this invention is now illustrated by the following representative examples of certain preferred embodiments thereof, wherein all parts, proportions and percentages are by weight unless otherwise specified.

EXAMPLE 1

Two 2-liter stirred autoclave reactors are connected in series and provided with inlets and outlets as shown in the drawing. Suitable metering feed pumps are provided to feed the monomers and initiator solution at a pressure of 900 p.s.i.g. which is maintained by a pressure control valve on the second reactor outlet. The reactors are filled with a solution of 0.99 g./lit. ammonium persulfate in water. The first reactor is heated to and maintained at a temperature of 78° C., and the second reactor is heated to and maintained at 105° C. A mixture of vinylidene fluoride (141.9 g./hr.) and hexafluoropropylene (106.8 g./hr.) is compressed and fed to the first reactor along with a solution of 0.99 g./lit. ammonium persulfate in water (4.0 lit./hr.) giving a nominal residence time of 30 minutes in the first reactor. During this time 94.4% of the monomers fed polymerize to give an aqueous emulsion containing 4.8% by weight polymer which when isolated has an inherent viscosity of 1.61 and contains 59.5% vinylidene fluoride. The rate of polymerization under these conditions is 234.7 g./hr.

The effluent emulsion from the first reactor is fed directly to the second reactor along with 4.9 g./min. of diethyl malonate, 466.9 g./hr. vinylidene fluoride and 351.6 g./hr. hexafluoropropylene. The second reactor is maintained at 105° C. and polymerization proceeds to produce an emulsion containing 20.3% polymer which when isolated has an inherent viscosity 0.89 and vinylidene fluoride content of 57.8%.

The overall production rate for both reactors is 1020.2 g./hr. for a total conversion of 95.4%. The polymerization rate in the second reactor is thus 785.5 g./hr. of a polymer with a calculated inherent viscosity of 0.66.

The polymer is isolated by coagulation of the emulsion followed by filtration, washing and drying of the crumb. It is compounded with 30 phr. MT black, 3 MgO, 6 Ca(OH)$_2$, 2 bisphenol AF, and 0.5 benzyltriphenylphosphonium chloride and cured under pressure for 10 minutes at 177° C. followed by an oven cure of 4 hours to 260° C. and 18 hours at 260° C. Table I gives a comparison of the physical properties of this vulcanizate with those of a polymer prepared by the cyclic process of Moore. It can be seen that a polymer having substantially equivalent properties has been produced by the more convenient and controllable process of this invention.

TABLE I.—PHYSICAL PROPERTIES OF COMPOUNDED STOCKS

| Property | Copolymer of Moore, ser. no. 197,512, control | Cascade process copolymer |
| --- | --- | --- |
| Hardness (Shore A) (ASTM test D–676) | 72 | 72 |
| Compression Set (ASTM test D–395–61, Method B) (70 hours at 450° F., pellets) | 29% | 33% |
| Elongation at break (ASTM test D–412–66) | 160% | 160% |
| Tensile set at break (ASTM test D–412–66) | 5% | 5% |
| Strain at 100% stress, p.s.i. (ASTM test D–412–66) | 1,000 | 1,035 |
| Tensile strength at break, p.s.i. (ASTM test D–412–66) | 1,750 | 1,710 |

NOTES:
Curing recipe: Polymer, 100; MT Black, 30; Magnesium oxide, 3; Calcium hydroxide, 6; Bisphenol AF, 2; Benzyltriphenyl phosphonium chloride, 0.5.
Curing cycle: 10 minutes at 350. F. Post cure—4 hours in steps to 500° F., 18 hours at 500° F.

EXAMPLE 2

Equipment is used as in Example 1 except that separate addition points are provided for the supply of an initiator reducing agent to the first reactor and for supply of additional initiator solution to the second reactor. The reactors are both maintained at 110° C. and at 900 p.s.i.g.

Feeds to the first reactor are:

3 l./hr. of a solution of 0.67 g./l. of ammonium persulfate and 0.2 g./l. of NaOH in water
3 l./hr. of a solution of 0.366 g./l. of sodium sulfite in water
400 g./hr. tetrafluoroethylene
830 g./hr. vinylidene fluoride
770 g./hr. hexafluoropropylene Polymerization proceeds to produce an emulsion containing 1740 g./hr. (22.5%) of polymer which has an inherent viscosity of 1.91 and an estimated composition 23% tetrafluoroethylene, 40% vinylidene fluoride, and 31% hexafluoropropylene.

This emulsion is fed directly to the second reactor along with 6 l./hr. of a solution of 2.78 g./l. of ammonium persulfite and 0.8 g./l. of NaOH in water
4 g./hr. diethyl malonate
450 g./hr. tetrafluoroethylene
850 g./hr. vinylidene fluoride
640 g./hr. hexafluoropropylene Polymerization proceeds to produce a final emulsion containing 23.2% polymer (3,630 g./hr.) which when isolated has an inherent viscosity of 1.20, and a composition of 24% tetrafluoroethylene, 45% vinylidene fluoride, and 31% hexafluoropropylene.

By calculation, polymer having an inherent viscosity of 0.45 is produced in the second reactor at a rate of 1,880 g./hr.

Polymer produced in this process shows superior processing and extrusion when compared to polymers of the same composition and inherent viscosity produced in a single reactor.

I claim:

1. The process for the continuous copolymerization of vinylidene fluoride with at least one other polymerizable, unsaturated fluorinated monomer in aqueous emulsion to a polymeric product having broad molecular weight distribution, said process comprising the following steps:
   (1) Introducing the monomers, water, and a water-soluble free radical generator at a concentration of about 0.001–2 weight percent based on the total monomers, but no chain transfer agent, into the first of two reactors equipped with agitating means and maintained at a temperature of about 50–130° C., and a pressure of about 250–1,500 p.s.i.g. at such a flow rate that the residence time is sufficient to form a copolymer having an inherent viscosity of approximately 1.5–3.0;
   (2) withdrawing the product stream from the first reactor at the same rate as the feed rate of materials into said reactor and immediately introducing said product into the second of the two reactors equipped with agitating means and maintained at a temperature of about 50–130° C. and a pressure of about 250–1,500 p.s.i.g.;
   (3) introducing the said second reactor an additional quantity of fluorinated monomers and a chain transfer agent, the proportion of said chain transfer agent being about 1–6 moles per mole of free radical generator, and the residence time in said second reactor being sufficient to produce a copolymer having an inherent viscosity of approximately 0.1–0.8; and
   (4) continuously withdrawing the product emulsion from the second reactor and separating the polymeric product therefrom;
      with the proviso that the inherent viscosity of each copolymer is measured at a concentration of 0.1 g. of copolymer in 100 ml. of a mixture of 86.1 weight percent of tetrahydrofuran and 13.9 weight percent of dimethylformamide at 30° C.

2. The process of Claim 1 wherein additional free radical generator is introduced to the second reactor.

3. The process of Claim 1 wherein the pressure in each reactor is about 600–900 p.s.i.g.

4. The process of Claim 1 wherein the temperature in each reactor is about 100–130° C.

5. The process of Claim 1 wherein an emulsion stabilizer is added to the first reactor.

6. The process of Claim 1 wherein the fluorinated monomers introduced into each reactor are vinylidene fluoride and hexafluoropropylene in weight proportions of about 30:70 to 70:30.

7. The process of Claim 1 wherein the fluorinated monomers comprise 25–70% of vinylidene fluoride, 16–90% of hexafluoropropylene, and 3–35% of tetrafluoroethylene, all percentages being by weight.

8. The process of Claim 1 wherein the free radical generator is ammonium persulfate.

9. The process of Claim 1 wherein the chain transfer agent is diethyl malonate.

References Cited

UNITED STATES PATENTS

| | | | |
|---|---|---|---|
| 2,968,649 | 1/1961 | Pailthorp et al. | 260—80.5 |
| 3,023,187 | 2/1962 | Lo | 260—41 |
| 3,080,347 | 3/1963 | Sandberg et al. | 260—80.5 |
| 3,335,106 | 8/1967 | Sianesi et al. | 260—29.6 |
| 3,531,432 | 9/1970 | Graver | 260—41 |
| 3,547,857 | 12/1970 | Murray | 260—85.5 |
| 3,560,595 | 2/1971 | Phillips et al. | 260—900 |

STANFORD M. LEVIN, Primary Examiner

U.S. Cl. X.R.

260—41 C, 87.7, 900